US006198595B1

(12) United States Patent
Park et al.

(10) Patent No.: US 6,198,595 B1
(45) Date of Patent: Mar. 6, 2001

(54) LOGIC DECK MECHANISM FOR PORTABLE AUDIO

(75) Inventors: Tae-won Park; Chang-jip Lee, both of Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/960,657

(22) Filed: Oct. 30, 1997

(30) Foreign Application Priority Data

Oct. 31, 1996 (KR) .................................................. 96-51477

(51) Int. Cl.[7] ............................ G11B 15/28; G11B 15/10
(52) U.S. Cl. ........................................ 360/96.2; 360/96.1
(58) Field of Search ................................ 360/96.1, 96.2; 226/181; 242/354.1

(56) References Cited

U.S. PATENT DOCUMENTS

| 3,741,564 | * | 6/1973 | Schulz | 274/4 D |
| 3,945,036 | * | 3/1976 | Karsh | 360/71 |
| 4,095,758 | * | 6/1978 | Shroff | 242/192 |
| 4,390,909 | * | 6/1983 | Sakamoto | 360/71 |
| 4,505,413 | * | 3/1985 | Kobayashi | 226/108 |
| 4,559,661 | * | 12/1985 | Muramatsu | 360/96.2 |

FOREIGN PATENT DOCUMENTS

| 626028 | 12/1983 | (JP) . |
| 60-34220 | 9/1986 | (JP) . |
| 60-62909 | 11/1986 | (JP) . |
| 632244 | 12/1987 | (JP) . |

* cited by examiner

Primary Examiner—William J Klimowicz
(74) Attorney, Agent, or Firm—Dilworth & Barrese, LLP

(57) ABSTRACT

A portable audio logic deck mechanism includes a main base; a driving source installed on the main base; a power transmitting unit including a pair of capstan wheels isolated from each other at a predetermined interval on the main base, a pulley installed on the main base to rotate a minute distance, a belt connecting the driving source, the capstan wheel, and the pulley to each other to transmit power, and a main gear rotating interlockingly with one of the capstan wheels; a pair of reel tables rotatably installed on the main base so that the reels of a tape cassette can be safely placed on the reel tables; an interlocking unit for transmitting power to either of the pair of reel tables being interlocked with the power transmitting unit; a recording/reproducing element for recording/reproducing information to a magnetic tape of the tape cassette; a mode changing unit for changing the rotation speed and the rotation direction of the pair of reel tables; a tension controlling unit for controlling the tension applied to the belt of the power transmitting unit in engagement with the mode changing unit; a lifting and lowering unit for lifting and lowering the recording/reproducing element; and an ejecting unit for loading/unloading the tape cassette.

19 Claims, 7 Drawing Sheets

LOGIC DECK MECHANISM FOR PORTABLE AUDIO

BACKGROUND OF THE INVENTION

1. Field of the Invention

The present invention relates to a portable audio logic deck mechanism driven by a single driving source, and more particularly, to a logic deck mechanism for a portable audio whereby power consumption can be reduced by reducing the load applied on a main slide during a power switch and a mode switch and also varying the position of a pulley according to the mode to thereby control the tension of a belt.

2. Description of Related Art

A general portable audio deck mechanism is basically divided into a manual deck mechanism in which its head is manually operated, and a logic deck mechanism in which its head is automatically operated. The portable audio deck can record or reproduce information by employing a magnetic tape as a recording medium, and performs a head operation, tape traveling, and mode switching by the power of a single driving motor.

As shown in FIGS. 1 and 2, a conventional logic deck mechanism for a portable audio deck is comprised of a driving source 20 constituted of a single motor fixed to a main base 10, a power transmitting unit 30 for transmitting power from the driving source 20, a pair of reel tables 40 (see FIG. 2) on which the reels (not shown) of a tape cassette are safely loaded, an interlocking unit 50 interlocking with the power transmitting unit 30, for transmitting power to either of the reel tables 40, a magnetic head 60 for conducting magnetic recording and reproduction, a mode changing unit 70 for lifting and lowering the magnetic head 60 and changing the rotation speed and the rotational direction of the reel tables 40, and an ejecting unit 80 for loading and unloading the tape cassette.

The power transmitting unit 30 includes a pulley 32, a pair of capstan wheels 33 and 34, a main gear 35 engaged with the capstan wheel 34, and a belt 31 for connecting the driving source 20, the pulley 32 and the capstan wheels 33 and 34. Accordingly, the rotating force of the driving source 20 is transmitted to the main gear 35.

The interlocking unit 50 includes a plurality of gears, and drives the reel table 40 using the rotating force transmitted through the main gear 35.

The mode changing unit 70 includes a cam gear 71 having a cam groove 71a, which selectively rotates by being engaged with the main gear 35, and a main slide 73 having a protrusion 73a to be combined with the cam groove 71a. The main slide 73 changes the operating mode by being linearly moved by the rotation of the cam gear 71.

The magnetic head 60 is installed on a head slide 61, and ascends and descends in engagement with the main slide 73.

The ejecting unit 80 is comprised of a switch knob 81, an eject slide 83 and lever members 85 and 87. In a still mode, the motion of the switch knob 81 opens a door (not shown). In an operating mode, the lever member 87 is caught in a stopper 74 installed on the main slide 73, so that opening of the door is prevented. Also, the head slide 61 may be selectively caught within a groove 83a on the eject slide 83, thereby performing an automatic music sensor (AMS) operation.

In the conventional portable audio logic deck mechanism having such a configuration, mode change, pivoting of a pinch roller, and raising and lowering of the magnetic head 60 are accomplished by the linear motion of the main slide 73. Thus, overloads are applied on the cam gear 71 for transferring the main slide 73.

The eject slide 83 and the lever member 85 must be additionally included to lift and lower the magnetic head 60 according to the movement of the main slide 73. A function of preventing the opening of the door is conducted separately with the AMS function in a play mode. Thus, the structure of the mechanism becomes complicated, and a large number of components is required.

Furthermore, the pulley 32 and the pair of capstan wheels 33 and 34 are rotatably fixed onto the main base 10, so it is impossible to vary the tension of the belt 31. That is, the tension of the belt 31 is always constant to be appropriate for the greatest load regardless of forward or reverse direction play modes, a high-speed winding mode, a still mode, etc. Therefore, the load applied to the power transmitting unit 30 is large even when a small load is needed as in the play mode, which wastes power.

SUMMARY OF THE INVENTION

It is an object of the present invention to provide a logic deck mechanism for a portable audio which employs two cam gears to prevent the raising and lowering of a magnetic head from interlocking with a main slide, and which can vary the tension applied to a belt according to each mode.

To accomplish the above object, there is provided a portable audio logic deck mechanism which comprises a main base; a driving source installed on the main base, a power transmitting unit including a pair of capstan wheels isolated from each other at a predetermined interval on the main base; a pulley installed on the main base to rotate a minute distance; a belt connecting the driving source, the capstan wheel, and the pulley to each other to transmit power, and a main gear rotating interlockingly with one of the capstan wheels; a pair of reel tables installed on the main base so that the reels of a tape cassette can be safely placed on the reel tables, respectively; an interlocking unit for transmitting power to either of the pair of reel tables being interlocked with the power transmitting unit; a recording/reproducing element for recording/reproducing information to a magnetic tape of the cassette; a mode changing unit for changing the rotation speed and the rotation direction of the reel tables; a tension controlling unit for controlling the tension applied to the belt of the power transmitting unit in engagement with the mode changing unit; a lifting and lowering unit for lifting and lowering the recording/reproducing element; and an ejecting unit for loading/unloading the tape cassette.

Here, the mode changing unit comprises a motive generator; a first cam gear which finely rotates by the motive generator and selectively engages with the power transmitting unit; a main slide installed on the main base to make a linear motion in engagement with the first cam gear; and a pinch roller for controlling the rotation speed of the tape in engagement with the power transmitting unit while interlocking with the main slide.

Also, the lifting and lowering unit comprises a second cam gear rotating in engagement with the mode changing unit; and a head lever member rotatably installed on the main base, whose one end contacts the head slide, for elevating the magnetic head by being interlocked with the second cam gear.

Furthermore, the tension controlling unit comprises a tension lever member rotatably installed on the main base and provided with one end to which the rotation shaft of the pulley is fixed; an elastic member for biasing the lever member in one direction; and driving means for rotating the tension lever member according to the linear motion of the main slide.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
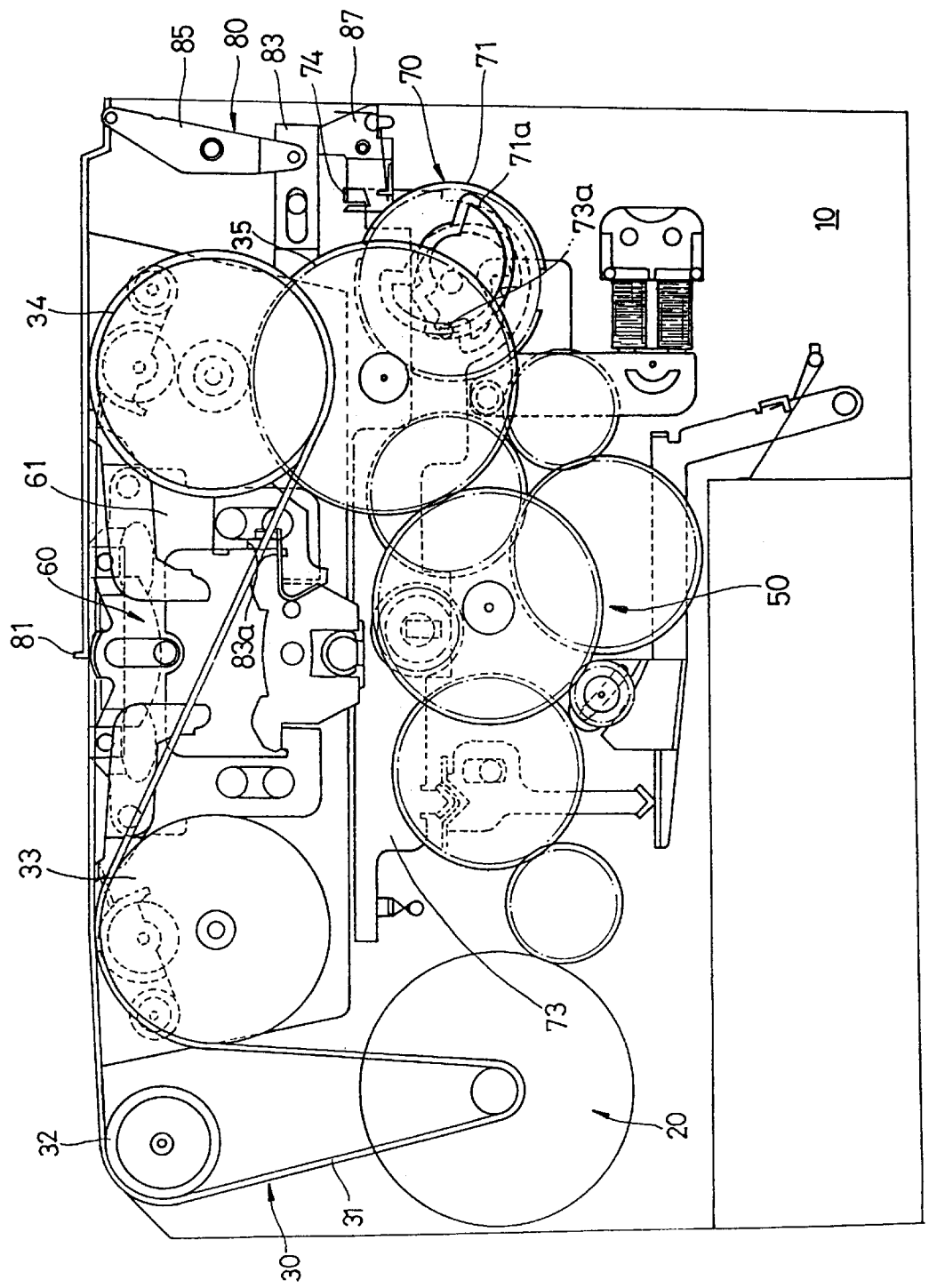
FIG. 1 is a schematic plan view of a conventional logic deck mechanism for a portable audio system.
Figure 2:
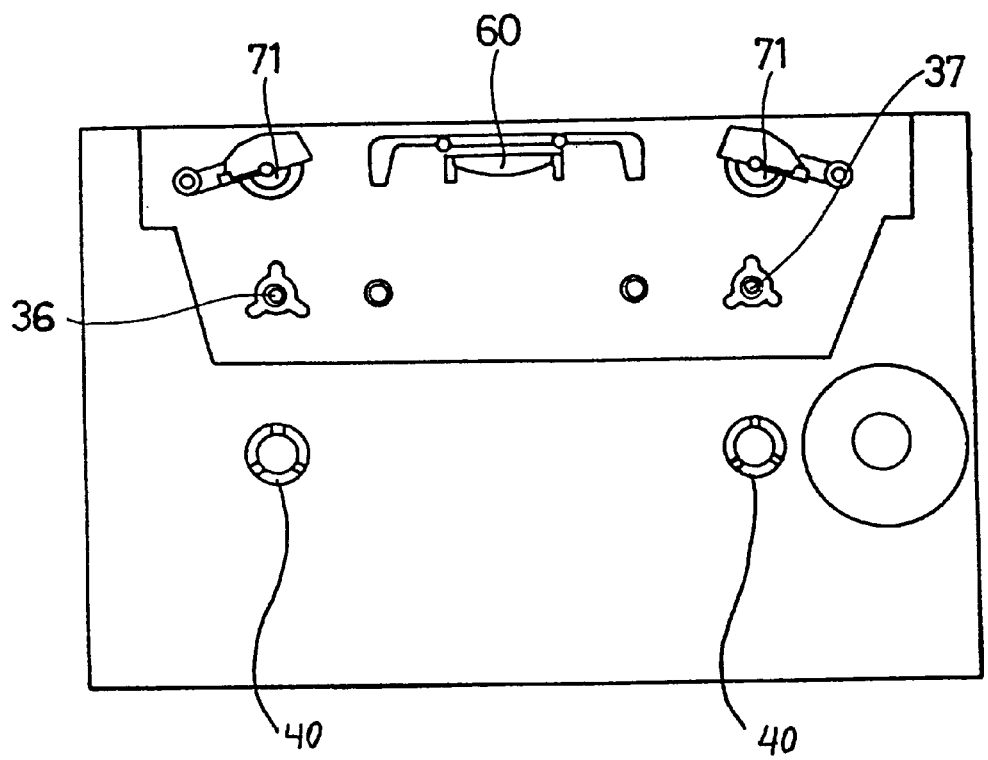
FIG. 2 is a bottom view of FIG. 1.
Figure 3:
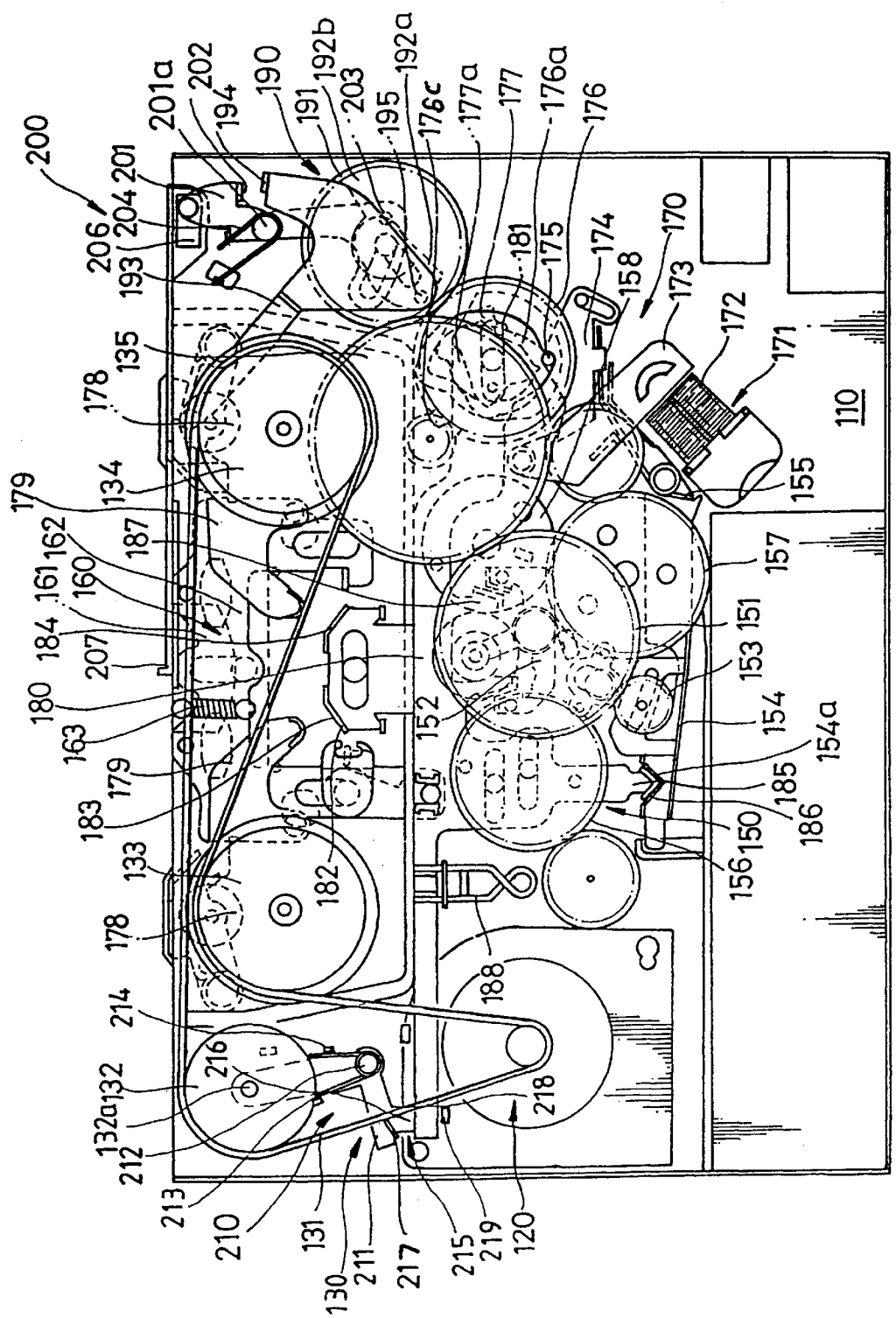
FIG. 3 is a schematic plan view showing a logic deck mechanism for a portable audio deck according to a preferred embodiment of the present invention in a still mode.
Figure 4:
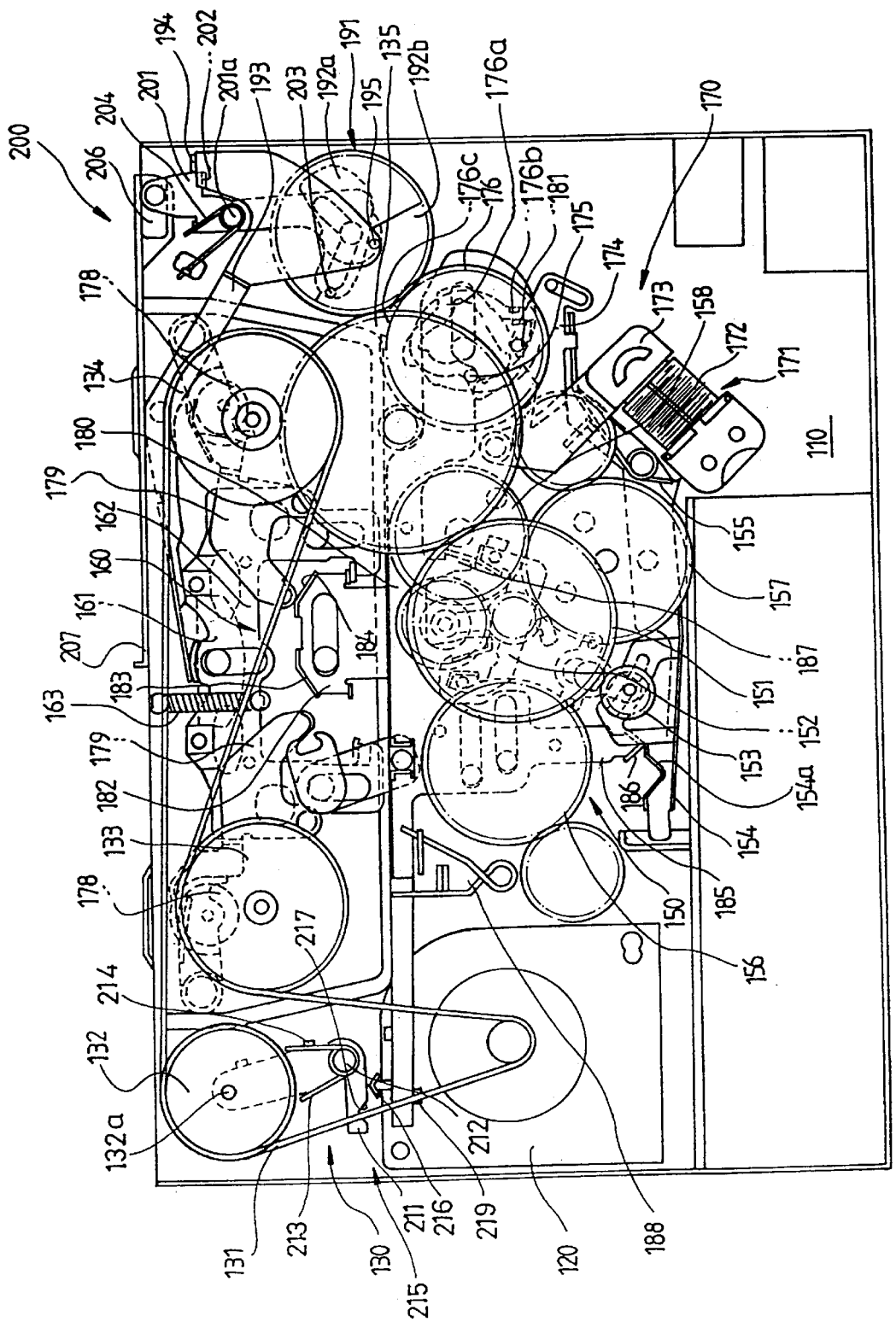
FIG. 4 is a schematic plan view showing a logic deck mechanism for a portable audio deck according to a preferred embodiment of the present invention in a forward direction play mode.
Figure 5:
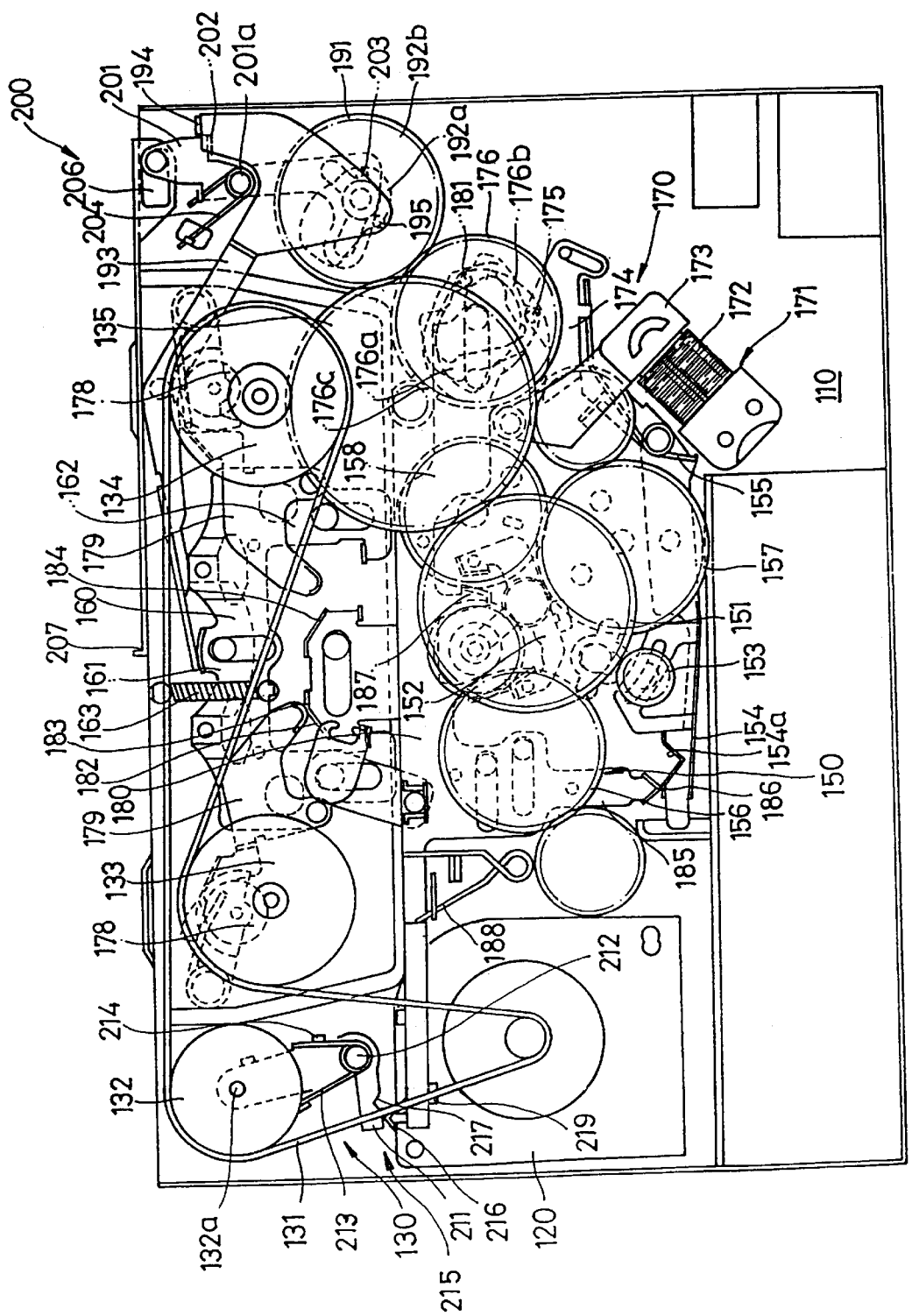
FIG. 5 is a schematic plan view showing a logic deck mechanism for a portable audio deck according to a preferred embodiment of the present invention in a reverse direction play mode.

Referring to FIGS. 3 through 5, a portable audio logic deck mechanism according to a preferred embodiment of the present invention includes a main base 110, a driving source 120 constituted of a single motor installed on the main base 110, a power transmitting unit 130 having a belt 131 for transmitting power from the driving source 120, a pair of reel tables 40 (see FIG. 2) on which the reels of a tape cassette (not shown) are loaded, an interlocking unit 150 interlocking with the power transmitting unit 130 for transmitting power to either of the reel tables 40, a recording/reproducing element 160 for performing magnetic recording and reproduction, a mode changing unit 170 for changing the rotation speed and the rotation direction of the reel table 40, a tension controlling unit 210 engaged with the mode changing unit 170 for controlling the tension applied to the belt 131 of the power transmitting unit 130, a lifting and lowering unit 190 engaged with the mode transforming unit 170 for lifting and lowering the recording/reproducing element 160, and an ejecting unit 200 for loading and unloading the tape.

The pair of reel tables 40 are selectively rotated by a forward or reverse direction rotation of the driving source 120. The rotation speed of the reel table 40 is determined by the interlocking unit 150.

The power transmitting unit 130 transmits power from the driving source 120 to the interlocking unit 150 and the mode changing unit 170. The power transmitting unit 130 is comprised of a pair of capstan wheels 133 and 134 isolated from each other at a predetermined interval, a pulley 132 installed on the main base 110 enabling movement in a small distance, a main gear 135 rotating in engagement with the capstan wheel 134, and a belt 131 winding the driving source 120, the pulley 132 and the capstan wheels 133 and 134. The belt 131 is wound in an anti-rolling manner so that the pair of capstan wheels 133 and 134 can rotate in opposite directions to each other. The capstan wheels 133 and 134 have rotating shafts 36 and 37 (see FIG. 2) protruding toward the rear surface of the main base 110, respectively. Each of the rotating shafts 36 and 37 transmits a rotating force in selective engagement with a pinch roller 178.

The interlocking unit 150 is comprised of first and second lever members 152 and 154 rotatably installed on the main base 110, an idle gear 153 for selectively transmitting a rotating force to the capstan wheels 133 or 134, intermediate gears 156 and 157 and a relay gear 158, a clutch gear 151 which is selectively engaged with the intermediate gear 157 or idle gear 153 by the rotation of the first and second lever members 152 and 154, and a spring 155.

The idle gear 153 is fixed to the second lever member 154, and selectively engaged with the clutch gear 151 or the intermediate gears 156 and 157 depending on the mode.

In a reproduction mode, the clutch gear 151 interlocks with the intermediate gear 157 by the rotation of the first lever member 152. On the other hand, in a high-speed winding mode, the clutch gear 151 interlocks with the idle gear 153 by the rotation of the second lever member 154.

The recording/reproducing element 160 is comprised of a head slide 162 slidably installed on the main base 110, a magnetic head 161 fixed to the head slide 162 for selectively contacting with a magnetic tape, and a head elastic member 163 for biasing the head slide 162 toward one direction. The magnetic head 160 and the head slide 162 are lifted and lowered by the lifting and lowering unit 190.

The mode changing unit 170 includes a motive generator 171, a first cam gear 176 which is finely rotated by the motive generator 171 and selectively engaged with the power transmitting unit 130, a main slide 180 making a linear movement in engagement with the first cam gear 176, and the pinch roller 178 being interlocked with the main slide 180 for controlling the traveling speed of the magnetic tape in engagement with the power transmitting unit 130.

The motive generator 171 is comprised of an arm 173, an electromagnet 172 for linearly transferring the arm 173 using an applied current, and a link member 174 rotatably installed on the main base 110, whose one end is fixed to the arm 173 and a first guide protrusion 175 to be inserted into a first cam groove 176a of the first cam gear 176 is formed on the other end. Thus, the link member 174 is rotated by the linear movement of the arm 173, so that the first cam gear 176 is finely rotated.

The first cam gear 176 has an idling gear portion 176c formed on the outer circumference so that the first cam gear 176 can be selectively engaged with the main gear 135. Accordingly, the rotation force of the main gear 135 is not transmitted to the first cam gear 176 in a still mode, a high-speed winding mode and a play mode. On the other hand, the first cam gear 176 is minutely rotated by the driving of the motive generator 171 during a mode change, thus being engaged with the main gear 135. Accordingly, the rotation force of the main gear 135 is transmitted to the first cam gear 176.

The first cam groove 176a into which the first guide protrusion 175 is to be inserted is formed on one side of the first cam gear 176. A first cam groove 176b into which a second guide protrusion 181 of the main slide 180 is to be inserted is formed on the other side thereof.

The main slide 180 makes a linear motion in response to the rotation of the first cam gear 176, adheres the pinch roller 178 to the capstan wheels 133 and 134, and causes the idle gear 153 to be selectively interlocked with the clutch gear 151. For this, an upper protrusion 182, an auxiliary slide 185 and a lower protrusion 187 are formed on the main slide 180. The upper protrusion 182 has inclined surfaces 183 and 184 formed on its both upper ends.

A pair of pinch rollers 178 are installed on one end of each of third lever members 179 rotatably installed on the main base 110. The respective other ends of the third lever members 179 selectively contact the inclined surfaces 183 and 184 of the upper protrusion 182 to thus adhere the pinch roller 178 toward the capstan wheels 133 and 134.

The auxiliary slide 185 rotates the second lever member 154 existing under its lower part. The auxiliary slide 185 has an inclined end 186. The second lever member 154 has a guide groove 154a slantingly formed so that the inclined end 186 of the auxiliary slide 185 can fit therein. Accordingly, the end 186 is inserted into or separated from the guide groove 154a when the auxiliary slide 185 moves to the left and right, so that the second lever member 154 ascends and descends. The second lever member 154 receives a force in one direction by the spring 155 to allow the idle gear 153 to engage with the clutch gear 151 when being released from the pressure by the auxiliary slide 185.

The lower protrusion 187 rotates the first lever member 152. That is, the first lever member 152 rotatably combines with the main base 110, and rotates to the left and right according to the linear movement of the main slide 180 with a part of the first lever member 152 contacting the lower protrusion 187. Also, the main slide 180 is biased by an elastic member 188 to be placed, for example, at a middle point corresponding to a position in a still mode.

The lifting and lowering unit 190 is comprised of a second cam gear 191 rotating in engagement with the first cam gear 176, and a head lever member 193 for lifting and lowering the magnetic head 160 in engagement with the second cam gear 191.

The second cam gear 191 has a pair of second cam grooves 192a and 192b into which a hooking protrusion 195 of the head lever member 193 and a hooking protrusion 203 of the ejecting unit 200 are to be inserted, respectively. Each of the second cam grooves 192a and 192b is shaped to have a predetermined closed curve line such that the head lever member 193 can rotate around its rotation shaft during rotation of the second cam gear 191. The head lever member 193 is provided with one end which engages with the second cam gear 191 and selectively presses against the head slide 162, and the other end at which a first stopper 194 is formed to make the magnetic head 160 be placed at a position for the automatic music sensor (AMS) operation in the high-speed rotation mode and to prevent the door (not shown) from opening by interlocking with the ejecting unit 200 in a play mode.

Figure 6:
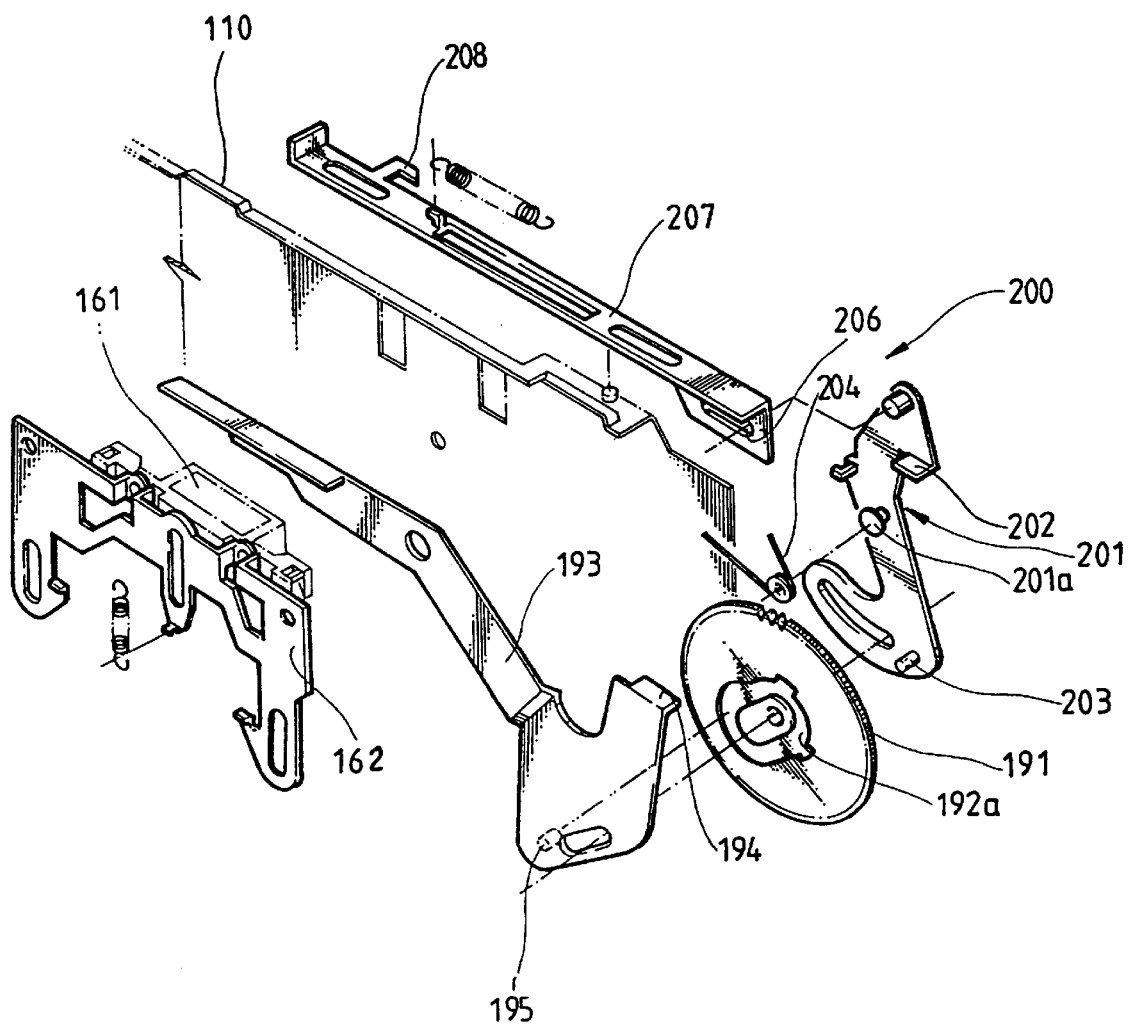
FIG. 6 is an exploded perspective view of an ejecting lever in the logic deck mechanism for a portable audio deck according to the present invention in a still mode.
Figure 7:
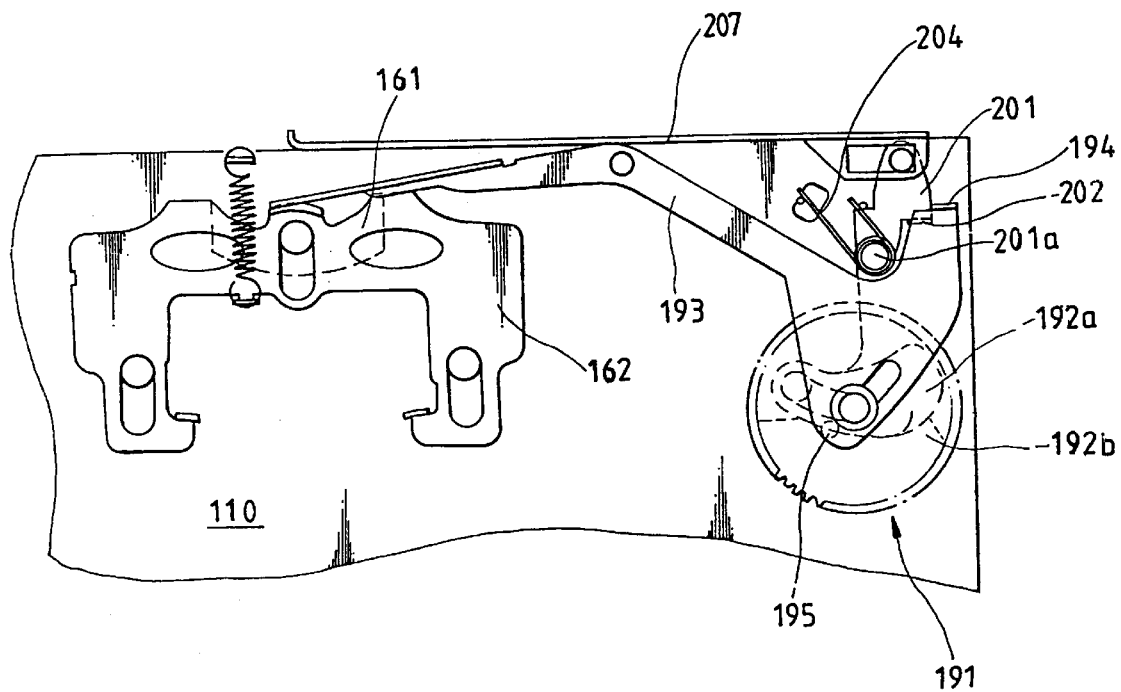
FIG. 7 a schematic plan view showing an ejecting lever in the logic deck mechanism for a portable audio deck according to the present invention in a forward direction play mode.

Referring to FIGS. 3, 6 and 7, the ejecting unit 200 is comprised of a switch knob 207 installed on the main base 110, an eject lever member 201 on which a hooking protrusion 203 to be combined with the second cam groove 192b is formed, and an elastic member 204 for pressing against the eject lever member 201 in one direction. A lock member 208 is formed on one end of the switch knob 207 to be caught in the door (not shown). One end of the eject lever member 201 is inserted into a slot 206 of the switch knob 207, and a second stopper 202 is formed on the other end thereof to catch the first stopper 194. The eject lever member 201 is rotatably installed on the main base 110 for rotation around its rotation shaft 201a which is in engagement with the switch knob 207, and selectively prevents the operation of the switch knob 207 according to a selected mode.

The operation of the ejecting unit 200 will be described in more detail for each of a still mode, a play mode and a high-speed rotation mode.

As shown in FIG. 6, in the still mode, a portion of the head lever member 193 contacting the head slide 162 ascends, but the first stopper 194 descends, depending on the rotation position of the second cam gear 191. Thus, since the first and second stoppers 194 and 202 do not contact each other, the eject lever member 201 freely rotates in engagement with the switch knob 207. Accordingly, the door (not shown) can be opened.

As shown in FIG. 7, in the play mode, the hooking protrusion 195 moves according to the second cam groove 192a by the rotation of the second cam gear 191, so that a portion of the head lever member 193 contacting the head slide 162 descends but the first stopper 194 ascends to be above the second stopper 202. Accordingly, when the switch knob 207 slides, the second stopper 202 ascends a small distance and then contacts the first stopper 194. Therefore, the rotation of the eject lever member 201 and the sliding of the switch knob 207 are limited, so that opening of the door (not shown) is prevented.

The head lever member 193 in the high-speed mode is disposed similar to that in FIG. 7, and thus defines a movable area for the eject lever member 201 and the switch knob 207. Also, the head lever member 193 is partially rotated to partially contact a traveling tape on which the magnetic head 161 travels, thereby performing the AMS function.

The tension controlling unit 210 includes a tension lever member 211 installed on the main base 110 to be able to rotate in engagement with the main slide 180, an elastic member 213 for elastically supporting the tension lever member 211, and a driving means 215 for rotating the tension lever member 211.

A rotation shaft 132a of the pulley 132 is installed on one end of the tension lever member 211, and a rotation shaft 212 of the tension lever member 211 is fixed to the main base 110. The rotation of the tension lever member 211 can cause the rotation shaft 132a of the pulley 132 to rotate a small distance. Preferably, the elastic member 213 is a torsion coil spring for biasing the tension lever member 211 with respect to the main base 110 in one direction. Therefore, the pulley 132 can be stably maintained even when a force applied to the tension lever member 211 is released by the driving means 215. It is preferable that the deck mechanism further comprises a first guide bar 214 protruded from the main base 110 at either side of the tension lever member 211 to define the rotating range of the tension lever member 211.

The driving means 215 rotates the tension lever member 211 in engagement with the main slide 180, and includes an inclined groove 217 with inclined sides formed on the tension lever member 211, and a guide protrusion 216 protruding on the main slide 180 to correspond to the inclined groove 217. Alternately, a guide protrusion can be formed on the tension lever member, and an inclined groove can be formed on the main slide.

In the still mode, the guide protrusion 216 is located within the inclined groove 217 such that the tension lever member 211 does not rotate.

In forward and reverse direction play modes, as shown in FIGS. 4 and 5, the guide protrusion 216 departs from the inclined groove 217 and contacts peripheral units, such that the tension lever member 211 rotates a minute distance.

Accordingly, a tension applied to the pulley 132 is more or less alleviated. Thus, power consumption can be reduced by optimizing the tension applied to the belt in the forward and reverse direction play modes.

Also, it is preferable to further comprise a second guide bar 219 protrudingly formed on the main base 110, in order to prevent the rotation of the main slide 180 and guide the main slide 180 to make a linear motion.

As described above, the logic deck mechanism for a portable audio deck according to the present invention includes two cam gears so that the ascent and descent of the magnetic head cannot be carried out by reciprocation of the main slide. Thus, a load applied to the main slide decreases. Since the ejecting unit is operated by the second cam gear, a simple mechanism can be provided.

Furthermore, the tension applied to the belt is controlled by varying the position of the pulley according to various modes, thus power consumption can be reduced.

Though the present invention was described referring to the embodiment shown in the drawings, it is just an example. It is apparent for those skilled in the art that various modifications and other equivalent embodiments may be effected within the scope of the present invention. Therefore, the true technical scope of protection of the present invention should be determined by the technical spirit of the following claims.

What is claimed is:

1. A portable audio logic deck mechanism comprising:
   a main base;
   a driving source installed on said main base;
   a power transmitting unit including a pair of capstan wheels isolated from each other at a predetermined interval on said main base, a pulley installed on said main base configured and dimensioned to rotate a minute distance, a belt connecting said driving source, said pair of capstan wheels, and said pulley to each other to transmit power, and a main gear rotating interlockingly with one of said pair of capstan wheels;
   a pair of reel tables rotatably installed on said main base so that the reels of a tape cassette can be safely placed on said reel tables;
   an interlocking unit for transmitting power to either of said pair of reel tables being interlocked with said power transmitting unit;
   a recording/reproducing element for recording/reproducing information to a magnetic tape of said tape cassette;
   a mode changing unit for changing the rotation speed and the rotation direction of said pair of reel tables;
   a tension controlling unit for controlling the tension applied to said belt of said power transmitting unit in engagement with said mode changing unit;
   a lifting and lowering unit for lifting and lowering said recording/reproducing element; and
   an ejecting unit for loading/unloading said tape cassette.

2. The portable audio logic mechanism as claimed in claim 1, wherein said mode changing unit comprises:
   a motive generator;
   a first cam gear which finely rotates by said motive generator and selectively engages with said power transmitting unit;
   a main slide installed on said main base to make a linear motion in engagement with said first cam gear; and
   a pinch roller, for controlling the rotation speed of said tape cassette, in engagement with said power transmitting unit while interlocking with said main slide.

3. The portable audio logic deck mechanism as claimed in claim 1, wherein said recording/reproducing element comprises:
   a head slide installed on said main base configured to ascend and descend;
   a magnetic head fixed to said head slide and selectively contacting said magnetic tape; and
   a head elastic member for biasing said head slide in one direction.

4. The portable audio logic deck mechanism as claimed in claim 3, wherein said lifting and lowering unit comprises:
   a second cam gear rotating in engagement with said mode changing unit; and
   a head lever member rotatably installed on said main base, whose one end contacts said head slide, for elevating said magnetic head by being interlocked with said second cam gear.

5. The portable audio logic deck mechanism as claimed in claim 4, wherein said head lever member comprises:
   a first stopper protrudingly formed on one end of said lever member, for controlling the operation of said ejecting unit; and
   a guide slot formed therein so that said head lever member can fit into a rotation shaft of said cam gear, for guiding the movement of said lever member.

6. The portable audio logic deck mechanism as claimed in claim 4, wherein said second cam gear has a second cam groove formed therein, and wherein a hooking protrusion formed on said head lever member is inserted into said second cam groove so that said head lever member can rotate by being interlocked with said second cam gear.

7. The portable audio logic deck mechanism as claimed in claim 5, wherein said ejecting unit comprises:
   a switch knob slidably installed on said main base, the switch knob having a lock member for locking a door formed on a first end thereof; and
   an eject lever rotatably fixed to said main base, one end of which is connected to said switch knob, said eject lever having a second stopper protruding to be able to contact said first stopper in a play mode.

8. The portable audio logic deck mechanism as claimed in claim 7, wherein said ejecting unit further comprises:
   an elastic member interposed between said main base and said switch knob to press against said switch knob in one direction.

9. The portable audio logic deck mechanism as claimed in claim 1, wherein said tension controlling unit comprises:
   a tension lever member rotatably installed on said main base having a first end to which a rotation shaft of said pulley is fixed;
   an elastic member for biasing said tension lever member in one direction; and
   driving means for rotating said tension lever member according to linear motion of a main slide.

10. The portable audio logic deck mechanism as claimed in claim 9, wherein said driving means comprises:
    an inclined groove formed on said tension lever member; and
    a guide protrusion formed on said main slide configured for insertion into and separation from said inclined groove according to reciprocation of said main slide.

11. The portable audio logic deck mechanism as claimed in claim 9, wherein said driving means comprises:
    an inclined groove formed on said main slide; and a guide protrusion formed on said tension lever member configured for insertion into and separation from said inclined groove according to the reciprocation of said main slide.

12. The portable audio logic deck mechanism as claimed in claim 9, further comprising a first guide bar formed on said main base to define a rotation range of said tension lever member.

13. The portable audio logic deck mechanism as claimed in claim 12, further comprising a second guide bar formed on said main base to guide the linear reciprocation of said main slide.

14. An audio logic deck mechanism comprising:

a main base;

a driving source installed on said main base;

a power transmitting unit including a pair of capstan wheels, a pulley, and a belt connecting said driving source, said pair of capstan wheels, and said pulley to each other to transmit power therebetween; and a tension controlling unit for controlling an amount of tension applied to said belt of said power transmitting unit.

15. The audio logic deck mechanism as claimed in claim 14, wherein said tension controlling unit comprises:

a tension lever member rotatably installed on said main base having a first end to which a rotation shaft of said pulley is fixed;

an elastic member for biasing said tension lever member in one direction; and driving means for rotating said tension lever member according to linear motion of a main slide.

16. The audio logic deck mechanism as claimed in claim 15, wherein said driving means comprises:

an inclined groove formed on said tension lever member; and a guide protrusion formed on said main slide configured for insertion into and separation from said inclined groove according to reciprocation of said main slide.

17. The audio logic deck mechanism as claimed in claim 15, wherein said driving means comprises:

an inclined groove formed on said main slide; and a guide protrusion formed on said tension lever member configured for insertion into and separation from said inclined groove according to the reciprocation of said main slide.

18. The audio logic deck mechanism as claimed in claim 15, further comprising a first guide bar formed on said main base to define a rotation range of said tension lever member.

19. The audio logic deck mechanism as claimed in claim 18, further comprising a second guide bar formed on said main base to guide the linear reciprocation of said main slide.

* * * * *